US005270621A

United States Patent [19]

Kiiski

[11] Patent Number: 5,270,621

[45] Date of Patent: Dec. 14, 1993

[54] PROCEDURE CONTROLLING THE MOTOR OF A CRANE

[75] Inventor: Tapani Kiiski, Hyvinkaa, Finland

[73] Assignee: Kone Oy, Helsinki, Finland

[21] Appl. No.: 808,625

[22] Filed: Dec. 17, 1991

[30] Foreign Application Priority Data

Dec. 17, 1990 [FI] Finland ........ 906226

[51] Int. Cl.[5] ........ H02P 3/00

[52] U.S. Cl. ........ 318/55; 318/59; 318/590; 212/160

[58] Field of Search ........ 318/53-62, 318/64, 16, 590; 212/160

[56] References Cited

U.S. PATENT DOCUMENTS 3,699,578 10/1972 Fiorentino ........ 318/16 X
3,732,570 5/1973 Fiorentino ........ 318/16 X
4,456,132 6/1984 LaValle et al. ........ 212/160
4,497,028 1/1985 Nozawa et al. ........ 318/53 X
4,912,377 3/1990 Bertrand ........ 318/59 X
4,956,588 9/1990 Ming ........ 318/53 X
4,958,112 9/1990 Zerillo ........ 318/16 X

FOREIGN PATENT DOCUMENTS 2130330 5/1984 United Kingdom .

*Primary Examiner*—William M. Shoop, Jr.
*Assistant Examiner*—David Martin
*Attorney, Agent, or Firm*—Sughrue, Mion, Zinn, Macpeak and Seas

[57] ABSTRACT

The present invention relates to a procedure for selecting the mode of controlling the motor of a crane, or an equivalent lifting apparatus, when at least two alternative modes of controlling the motor are available, and at least one of the modes involves control by means of a switch having at least two positions connectable in a predetermined order, so as to produce corresponding control signals at a control input port. Each control mode uses at least one control signal common to all modes. According to the invention, the control signals applied to a control input port are monitored, the prevailing control situation is determined on the basis of the monitored signals and the mode of control is selected on the basis of which ones of the signals are active and the prevailing control situation.

5 Claims, 2 Drawing Sheets

FLOW-CHART FOR SELECTION OF CONTROL MODE

PROCEDURE CONTROLLING THE MOTOR OF A CRANE

FIELD OF THE INVENTION

The present invention relates to a procedure for selecting the mode of control of the motor of a crane or an equivalent lifting apparatus.

BACKGROUND TO THE INVENTION

It is often necessary to be able to control the motor of a crane or an equivalent lifting apparatus from several locations In this case, care must be taken that only one control location is active at a time and that an operation once started can be completed without being influenced by another operator.

The motor is generally controlled by means of push-button controllers which select the direction of motion, and the length of time during which the push-button switch is closed determines the speed reference for the motor control system. An alternative is the joystick controller, in which the joystick position determines both the direction and the speed reference value. Push-button controllers are typically used in hanging controllers, which are located near the load to be lifted, whereas joystick controllers are commonly used in the control cabin of a crane.

The mode of operation (i.e. push-button or joystick) is typically selected by means of a separate selection switch, which can be placed, for example, in the control cabin In addition to the selection switch, the cabin must be provided with appropriate wiring for the selection signal, and the motor controller must be provided with an extra input for this purpose.

SUMMARY OF THE INVENTION

An object of the present invention is to provide a system permitting the selection of the control mode without the use of a separate switch and associated wiring, and thus to produce a simpler and more reliable connection.

According to the present invention, there is provided a procedure for selecting the mode of control of a crane motor when at least two alternative modes of controlling the motor are available, each of which control modes supplies a set of control input signals to respective control input ports of a motor controller, wherein each control mode involves at least one control signal common to all modes and the temporal order in which the various control signals are activated is characteristic of each respective control mode, said procedure comprising the steps of: monitoring the control signals being applied to the control input ports of the motor controller; determining the prevailing control situation on the basis of the monitored control signals; and selecting the mode of control on the basis of the monitored control signals and the prevailing control situation.

BRIEF DESCRIPTION OF THE DRAWINGS

Embodiments of the invention will now be described by way of example, with reference to the accompanying drawings, in which.

DETAILED DESCRIPTION OF A PREFERRED EMBODIMENT

Figure 1:
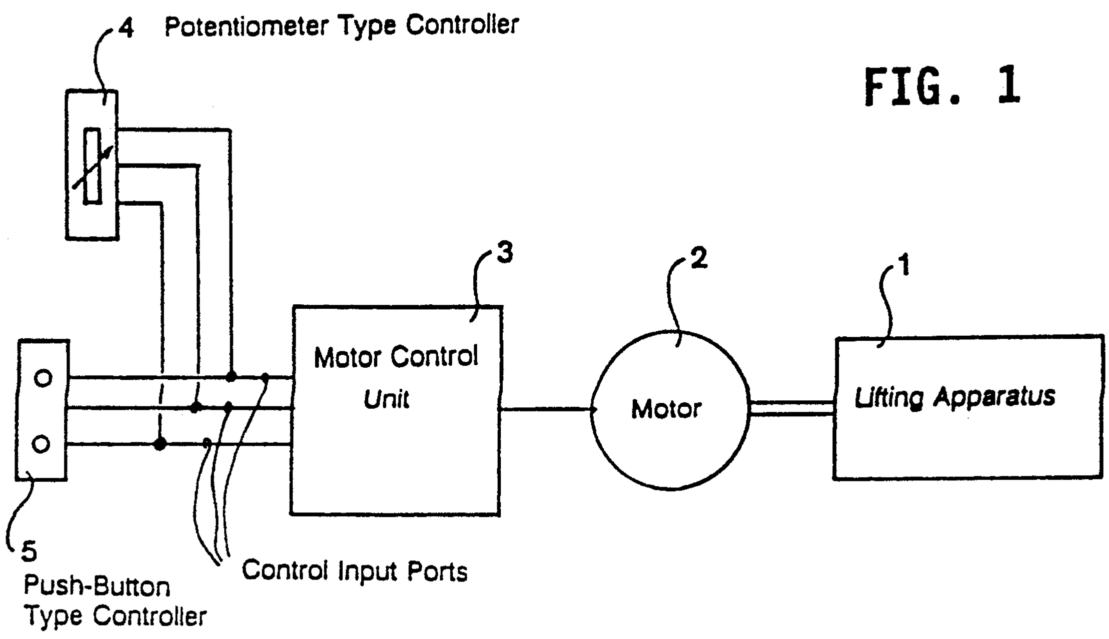
FIG. 1 presents block diagram of a motor control system in which the procedure of the invention is applied.

As shown in FIG. 1, the motor 2 of a lifting apparatus 1 is controlled by means of a control unit 3 The control unit 3 is conventionally fed from the mains (not shown) and converts the mains voltage into a form (i.e. a.c./d.c. conversion) suited for the motor type, and controls the motor in accordance with input control commands The input control commands for the apparatus are provided by means of two controllers 4 and 5, each of which can normally be used to control the horizontal and vertical motions of the crane. The motions in each direction are controlled by separate joysticks, push-buttons or equivalents.

A first controller 4 is implemented using potentiometer control (PO control), in which case the operator's control is a stepless movable control device or controller, such as a joystick. The control port of the control unit 3 typically has three inputs connected to the operator's control device These inputs are for the first and second direction signals (obtained when the control device is turned to the first and second directions respectively) and for an analog speed reference signal, which is proportional to the control device (i.e joystick) position The speed reference signal may vary between 0–10, for example, corresponding to a speed range of 0%–100% of the maximum motor speed. The analog reference may also contain a component determining the direction of motion, in which case its range of variation could be, for example, −10 to +10 V, corresponding to a speed range of −100% to +100%.

A second controller 5 is implemented as a push-button controller based on so-called electronic potentiometer control (EP control) For each direction of the crane motion (i.e. up, down, forward, backward, right, left) the EP controller 5 has a separate push-button used to control the speed and duration of the motion in the direction concerned The push-buttons used in crane drive systems are generally of the two-position type, in which the first position determines the start of motion in a particular direction, and a so-called initial acceleration, as well as the maintenance of the velocity of the level attained. The second position of the push-button determines the time-derivative of the speed reference signal to produce a given rate of acceleration until the maximum speed is reached. Releasing the push-button completely causes the motor to decelerate in a controlled manner down to zero speed.

Figure 2:
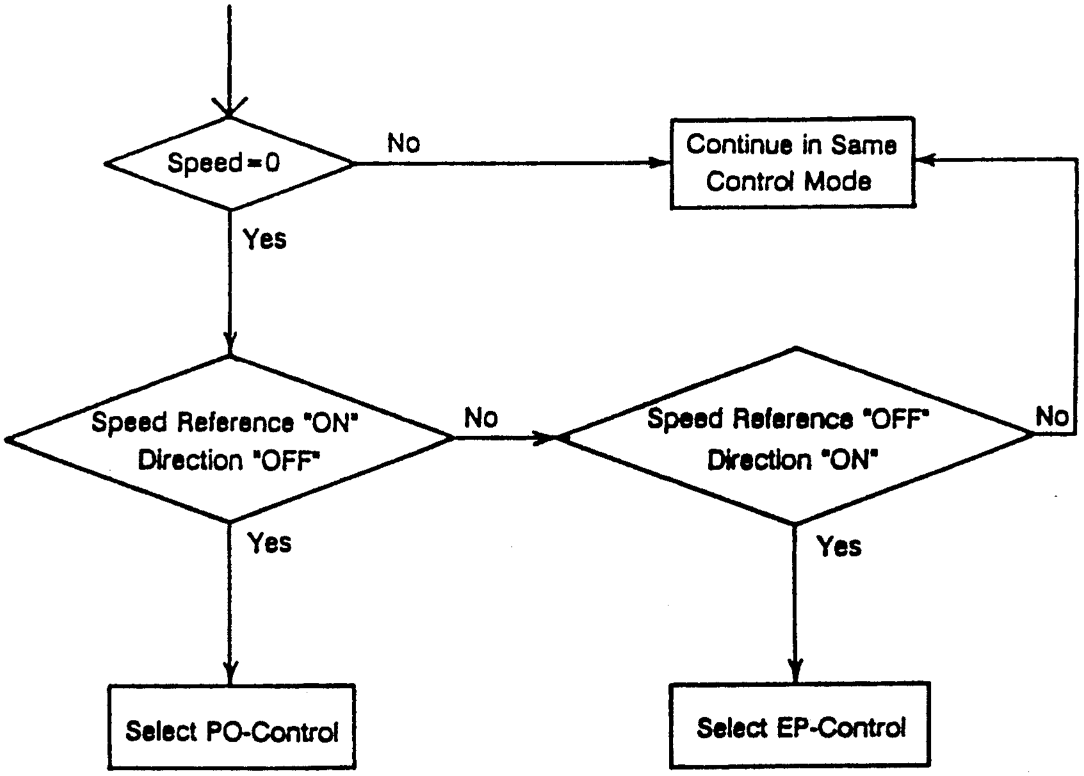
FIG. 2 presents the flow-chart of the procedure of the invention.

In the control mode used by the PO controller 4, the speed reference signal input is always activated first and the controller position always corresponds to the value of the speed reference signal. In the control mode used by the EP controller 5, the signal determining the direction is always activated first and only then can the speed reference signal be activated. The control unit 3 is provided with a monitoring circuit which senses the temporal order in which the control unit inputs are activated, i.e. whether the speed reference signal input in the control port is active when one of the direction inputs is active. FIG. 2 shows a flow diagram illustrating the selection of control mode.

Figure 3:
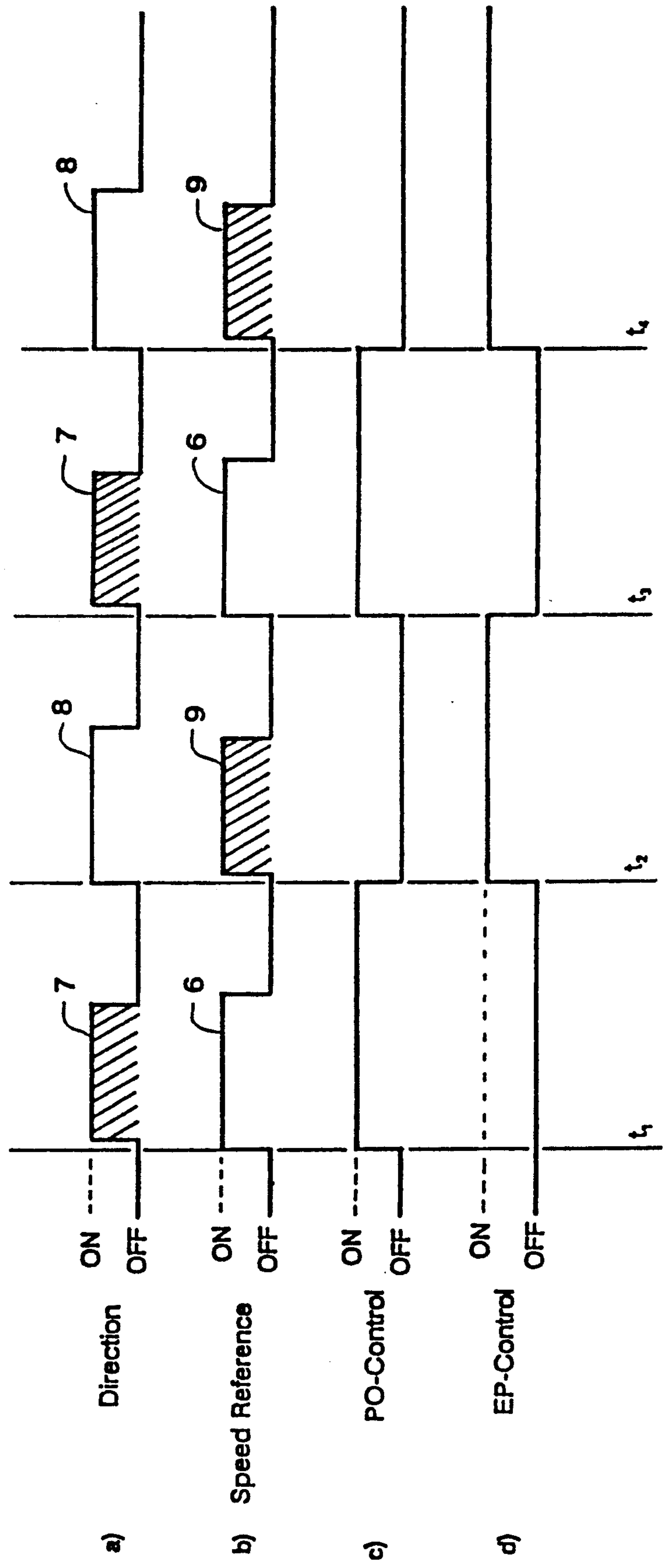
FIG. 3 presents a timing diagram for motor control according to the invention.

If the motor speed is not equal to zero, operation of the controller continues in the control mode currently in use. If the speed is zero and the speed reference signal input is active but the direction signal inputs inactive, the control mode of the PO controller 4 is selected. Conversely, if a direction input signal is active and the speed reference signal inactive the control mode of the EP controller 5 is selected. In other cases, the current control mode is maintained. Thus, the control mode is selected according to the order in which the control signals obtained from the controllers are activated, without using a separate selection switch. The physical implementation of the monitoring and selecting circuitry can be accomplished using techniques belonging to the expertise of a person skilled in the art and therefore will not be described in detail herein FIG. 3 presents a timing diagram illustrating the selection of control mode when control commands are given in different ways. Curves a and b represent the changes of the control signals with respect to time while curves c and d represent the selection of the control mode on the basis of the control signals, in accordance with the selection logic described above. At Time $T_1$, the speed reference signal 6 is on, while the direction signal 7 is off. Accordingly, the PO controller is selected, and subsequent changes in the direction signal 7 have no effect on the selected mode. At Time $T_2$, the speed is zero, and the direction signal 8 is turned on while the speed reference signal (at least momentarily) remains off. Accordingly, the EP controller 5 is selected, and subsequent changes in the speed reference signal 9 have no effect on the selected mode.

In this procedure, it is naturally necessary to take care that all the controllers and controller positions in each control device are included in the selection process. This prevents simultaneous use of the controller at one control point for a lifting movement and another controller for a traversing motion, for example.

In the foregoing, the invention has been described by referring to some of its embodiments. However, this presentation should not be regarded as restricting the invention, but the scope of the patent may vary within the limits defined in the following claims.

I claim:

1. A procedure for selecting the mode of control of a crane motor when at least two alternative modes of controlling the motor are available, each of which control modes supplies a set of control input signals to common control input ports of a motor controller, wherein each control mode involves at least one control signal common to all modes and the temporal order in which each member of a set of control signals is activated is characteristic of a respective control mode, said procedure comprising the steps of:

monitoring the control signals being applied to the control input ports of the motor controller;

determining the prevailing control situation on the basis of the monitored control signals; and selecting the mode of control on the basis of the monitored control signals and the prevailing control situation.

2. A procedure according to claim 1, wherein the prevailing control situation is determined primarily on the basis of the common control signals, and the mode of control is selected on the basis of the prevailing control situation and the temporal order in which the con· trol signals are activated.

3. A procedure according to claim 1, in which at leas one of the control modes involves at least one two-position switch, the first position of the switch producing a signal which determines the direction of rotation of a motor while the second position determines a motor speed reference signal, the speed reference signal being common to all control modes; wherein the control input port for the direction of rotation determining signal as well as the control port for the speed reference signal are monitored, and a first control mode is selected if the direction of rotation control signal becomes active first, whereas a second control mode is selected in other cases.

4. A procedure according to claim 1, wherein the control mode is not changed while the motor is rotating.

5. A procedure according to claim 1, wherein one control mode includes electronically controlled stepless variation of a speed reference signal, and a second control mode includes analog stepless variation of a speed reference signal.

* * * * *